(12) United States Patent
Inman (10) Patent No.: US 9,464,755 B1
(45) Date of Patent: Oct. 11, 2016

(54) VIARIABLE-POSITION MOUNTING DEVICE FOR HAND-HELD ELECTRONICS (71) Applicant: William Inman, Cornelia, GA (US)

(72) Inventor: William Inman, Cornelia, GA (US)

( * ) Notice: Subject to any disclaimer, the term of this patent is extended or adjusted under 35 U.S.C. 154(b) by 556 days.

(21) Appl. No.: 13/968,293

(22) Filed: Aug. 15, 2013

Related U.S. Application Data (60) Provisional application No. 61/695,090, filed on Aug. 30, 2012.

(51) Int. Cl.
A43C 1/04 (2006.01)
A45F 5/00 (2006.01)
F16M 13/02 (2006.01)
A45C 11/00 (2006.01)
H05K 5/00 (2006.01)

(52) U.S. Cl.
CPC ............. F16M 13/02 (2013.01); A45C 11/00 (2013.01); H05K 5/00 (2013.01)

(58) Field of Classification Search
CPC combination set(s) only.
See application file for complete search history.

(56) References Cited

U.S. PATENT DOCUMENTS

| 5,309,328 | A | * | 5/1994 | Lum | A45F 5/00 2/170 |
| 5,607,090 | A | * | 3/1997 | Brown | A45C 1/04 222/175 |
| 5,924,136 | A | * | 7/1999 | Ogean | A45C 1/04 2/159 |
| 6,330,961 | B1 | * | 12/2001 | Borja | A45C 1/04 224/221 |
| 8,662,362 | B1 | * | 3/2014 | Bastian | H04B 1/3888 224/197 |
| 8,939,333 | B2 | * | 1/2015 | Ivarez | H04B 1/3838 224/197 |
| 2003/0164389 | A1 | * | 9/2003 | Byers | A44C 5/0007 224/221 |
| 2009/0032560 | A1 | * | 2/2009 | Strandberg | A45F 5/00 224/267 |
| 2009/0321483 | A1 | * | 12/2009 | Froloff | A45F 5/00 224/267 |
| 2012/0217275 | A1 | * | 8/2012 | Yu | A45F 5/00 224/267 |
| 2013/0240578 | A1 | * | 9/2013 | Yu | H04B 1/385 224/197 |
| 2013/0240579 | A1 | * | 9/2013 | Yu | H04M 1/04 224/217 |
| 2013/0240580 | A1 | * | 9/2013 | Yu | A45F 5/00 224/217 |
| 2013/0277991 | A1 | * | 10/2013 | Wu | A45F 5/00 294/25 |
| 2015/0076183 | A1 | * | 3/2015 | Palma | A45F 5/004 224/162 |

* cited by examiner

Primary Examiner — Brian D Nash
(74) Attorney, Agent, or Firm — Quickpatents, LLC; Kevin Prince (57) ABSTRACT A wearable holder and method of using a wearable holder is disclosed for supporting a hand-held electronic device, such as a cell phone, smart phone, electronic tablet, or the like. The user mounts the handheld electronic device to the hand with at least two points of attachment, one being around one or more fingers and another being about the wrist. As such, the user has full use of his palm and fingers when holding the electronic device on the back of his hand. The wearable holder allows the user to easily reposition the electronic device to provide different modes of use, such as comfortable talking, texting, viewing in landscape and portrait without the need for a stand, or a monitoring or idle mode on his wrist. The wearable holder reduces the chance of the user dropping the portable electronic device.

13 Claims, 6 Drawing Sheets

VIARIABLE-POSITION MOUNTING DEVICE FOR HAND-HELD ELECTRONICS

CROSS-REFERENCE TO RELATED APPLICATIONS

This application claims the benefit of U.S. Provisional Patent Application 61/695,090, filed on Aug. 30, 2012, and incorporated herein by reference.

STATEMENT REGARDING FEDERALLY SPONSORED RESEARCH AND DEVELOPMENT

Not Applicable.

FIELD OF THE INVENTION

This invention relates to portable electronic devices, and in particular to a wearable holder for a handheld electronic device.

DISCUSSION OF RELATED ART

Portable hand-held electronic devices such as smart phones and tablets, and the like, have been exploding in popularity in recent years. For example, the APPLE® IPHONE® has sold millions of units across the world. Such devices are relatively expensive and have an estimated value of up to eight hundred dollars or more per unit. A large market has been created for producing protective cases for these types of portable electronics. Such protective cases can also cost between several dollars to over a hundred dollars or more. The protective cases are generally intended to protect the portable hand-held electronic device when it is dropped. However, the traditional protective cases have many limitations.

For example, many popular cases for portable electronic devices do not prevent the user from dropping their portable handheld electronic device. Additionally, traditional cases require the user to constantly hold their portable hand-held electronic device while it is being used. Taking away use of one's hand can prevent the user from comfortably writing, cleaning, working, sleeping, or even brushing their teeth, for example. Constantly holding a portable hand-held electronic device can also lead to hand fatigue and the growing problem of Repetitive Strain Injury.

Currently, many traditional cases for portable electronic devices restrict the user from conveniently using the device while walking, exercising, driving a vehicle, such as an automobile or a motorcycle.

To use a portable hand-held electronic device in an automobile, many jurisdictions require the user to buy a phone mount, which itself can be distracting, expensive, difficult to use and potentially dangerous when trying to read the device's display while mounted in such a device. Further, trying to use a hand-held portable electronic device in an automobile by simply positioning it on a seat or the dashboard can result in the device falling and becoming lost or damaged. As such there is often a panicked search for the misplaced smart phone when the phone rings, creating a potentially dangerously distracted driver situation, particularly while driving.

Other means of attaching a device such as a wrist band, wrist lanyard, or arm band are cumbersome, restricting, and do not allow practical hands-free utilization of the device.

Thus, the need exists for solutions to the above problems present in the prior art. The present invention accomplishes these objectives.

SUMMARY OF THE INVENTION

A primary objective of the present invention is to provide a holder, mounting device, system and method of using a wearable holder for supporting a hand-held electronic device, such as a cell phone, smart phone, electronic tablet, or the like, such that a user can attach the handheld electronic device to his hand at two points locations, such as one or more fingers and the wrist.

A secondary objective of the present invention is to provide a device to mount a hand-held electronic device to the back of the hand, thereby allowing the user full use of the palm and fingers of the hand.

A third objective of the present invention is to provide a device that allows the user to easily reposition the electronic device from a monitoring or idle mode, such as on his wrist, to various interaction positions in an in-use mode, such as talking on the phone, texting, viewing the device in a landscape or a portrait orientation, or the like, all without the need for a stand or a car mount.

A fourth objective of the present invention is to provide a holder that reduces the chance of the user dropping the portable electronic device, the holder being securely attached and worn like a backpack on the hand.

A fifth objective of the present invention is to provide a holder that reduces hand fatigue and the chance of Repetitive Strain Injury caused by excessive grasping and holding of the portable electronic device.

A sixth objective of the present invention is to provide a holder that allows the user to easily wear and safely use the electronic devices while sitting, walking, exercising, and driving a vehicle such as an automobile, truck, motorcycle, bicycle or the like.

The invention covers at least three embodiments.

First, the novel invention can be easily attached to an existing portable electronic device itself, or to a user's existing case. As such, the invention can be sold or licensed to smart phone manufacturers and/or distributors and/or sold to end-users of smart phones. In such a first embodiment of the invention, a wearable holder for a portable electronic device includes a base that has an upper surface for attaching to the portable electronic device, and a lower surface. A front loop is attached to a front portion of the lower surface of the base, and a rear loop is attached to a rear portion of the lower surface of the base. The front loop is adapted to wrap about one or more fingers of a user and the rear loop is adapted to wrap about a wrist of the user. Preferably the front loop and the rear loop are formed from a single length of cord material that traverses the base from the front portion to the rear portion.

Second, the novel invention can be built into an existing case for the portable electronic device. As such, the invention can be sold or licensed to manufacturers and/or distributors of cases for smart phones and other portable electronic devices. In such an embodiment the upper surface of the base incorporates the case for holding the portable electronic device. Such a case includes edge clamps for attaching the base to corner edges of the portable electronic device.

In another embodiment, the upper surface includes an attachment member for releasably attaching the base to a lower surface of the portable electronic device or, alternately, to a user's existing case for the portable electronic device. The attachment member may include, for example, a sticky adhesive layer beneath a removable liner. Alternately the attachment member includes a hook-and-loop type fastener.

Third, the novel invention can be built directly into the portable electronic device during manufacture. As such, the invention can be sold or licensed to smart phone manufacturers and/or distributors of smart phones. In such an embodiment, the wearable holder is incorporated into the portable electronic device and constitutes an improvement therein. The portable electronic device has a lower surface. A front loop is attached with a front portion of the lower surface, and a rear loop is attached with a rear portion of the lower surface. In such an embodiment the front loop is adapted to wrap about one or more fingers of a user's hand, and the rear loop is adapted to wrap about the wrist of the user. In such an embodiment the base of the other embodiments is incorporated into the portable electronic device itself, and the loops may be part of a single cord material that traverses through the lower surface of the phone through apertures therein.

In use, a method of mounting a portable electronic device to the user's hand comprises the steps of first providing the wearable holder as previously described. The rear loop is wrapped about the wrist of the user, and then the front loop is fixed about one or e more fingers of the user. Alternately the front loop may be enlarged by pulling more of the cord material away from the base such that the user's hand may traverse the front loop, whereby the portable electronic device may be positioned about the user's wrist with his hand free to move unencumbered by the portable electronic device or the wearable holder.

Further objects and advantages of this invention will be apparent from the following detailed description of the presently preferred embodiments which are illustrated schematically in the accompanying drawings.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

FIGS. 1-4 illustrate a first embodiment of the invention, wherein a wearable holder 10 for a portable electronic device 20 includes a base 40 that has an upper surface 48 for attaching to the portable electronic device 20, and a lower surface 42. The base 40 is preferably a rigid or semi-rigid material, such as plastic, leather, metal, or the like.

A front loop 52 is attached to a front portion 41 of the lower surface 42 of the base 40, and a rear loop 58 is attached to a rear portion 43 of the lower surface 42 of the base 40. The front loop 52 is adapted to wrap about one or more fingers 35 of a user 30 and the rear loop 58 is adapted to wrap about a wrist 36 of the user 30 (FIG. 5).

Preferably the front loop 52 and the rear loop 58 are formed from a single length of cord material 50 that traverses the base 50 from the front portion 41 to the rear portion 43. In one embodiment the cord material 50 includes an adjustable toggle 110 (FIGS. 6 and 11), such that the size of each loop 52,58 may be adjusted to fit the user 30. The cord material 50 may be an elastic cord, a non-elastic cord, thread, twine, a rubber cord, or the like.

Figure 5:
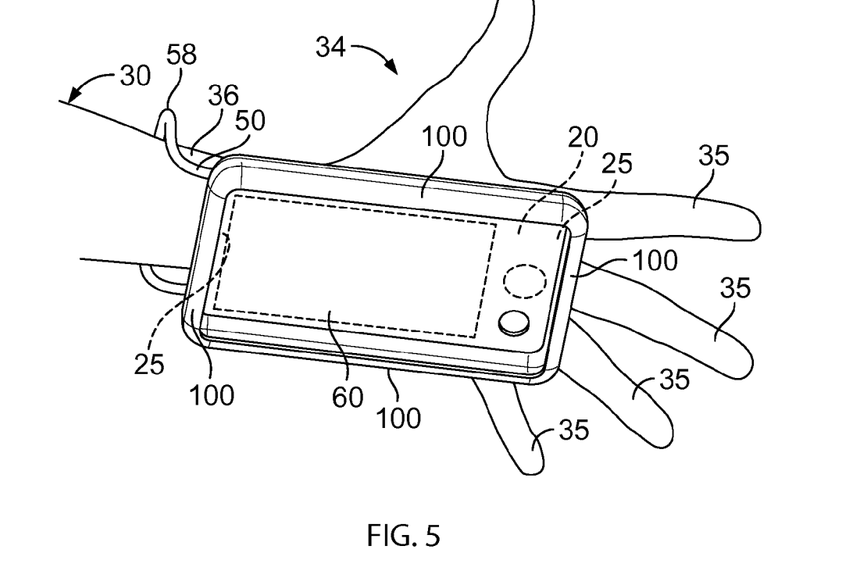
FIG. 5 is a perspective view of another embodiment of the invention that includes a case adapted for holding a portable electronic device.
Figure 10:
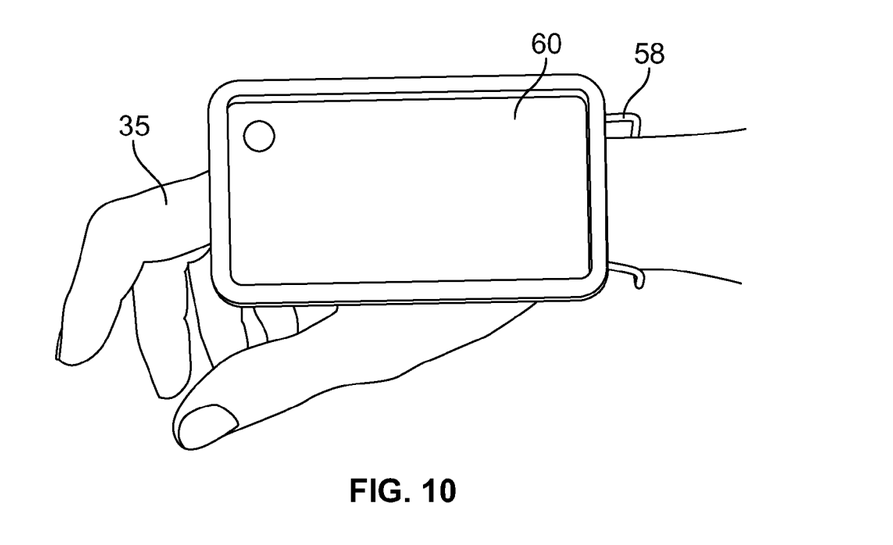
FIG. 10 is a perspective view of the embodiment of FIG. 5, illustrating the invention as worn around the side of the user's hand.
Figure 11:
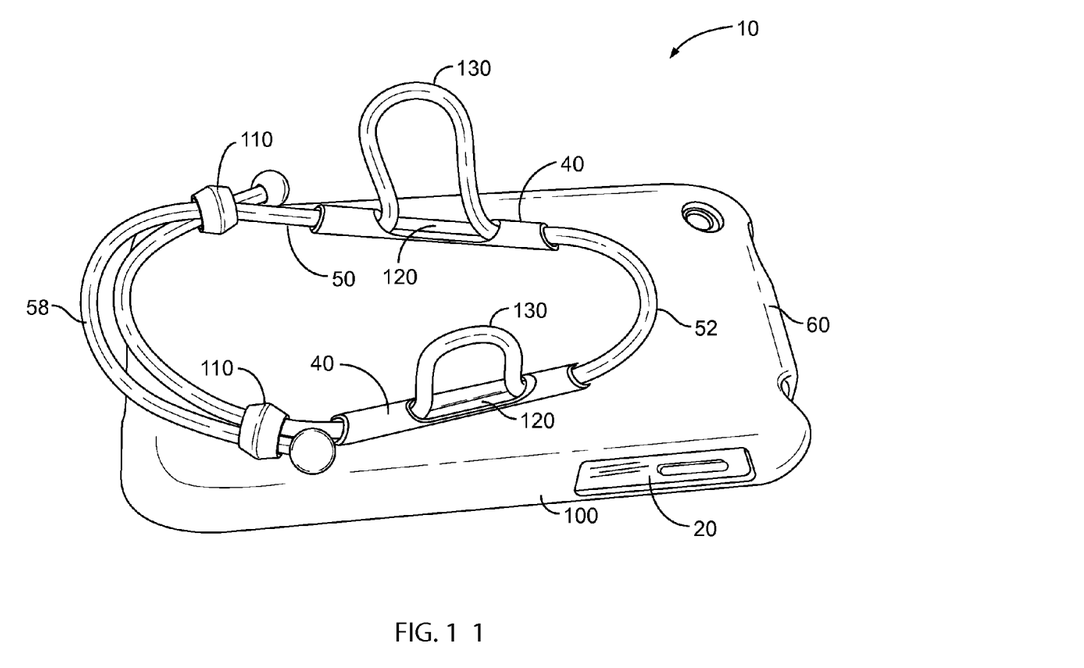
FIG. 11 is a bottom perspective view of an alternate embodiment of the invention having side loops.

In one embodiment the upper surface 48 of the base 40 incorporates a case 60 for holding the portable electronic device 20 (FIGS. 5, 10 and 11). Such a case 60 includes edge clamps 100 for attaching the base 60 to corner edges 25 of the portable electronic device 20 (FIG. 5). The base 40 may further include side apertures 120 (FIG. 11) for allow the cord material 50 to form side loops 130, allowing for further flexibility for the user 30 to hold the portable electronic device 20.

Figure 6:
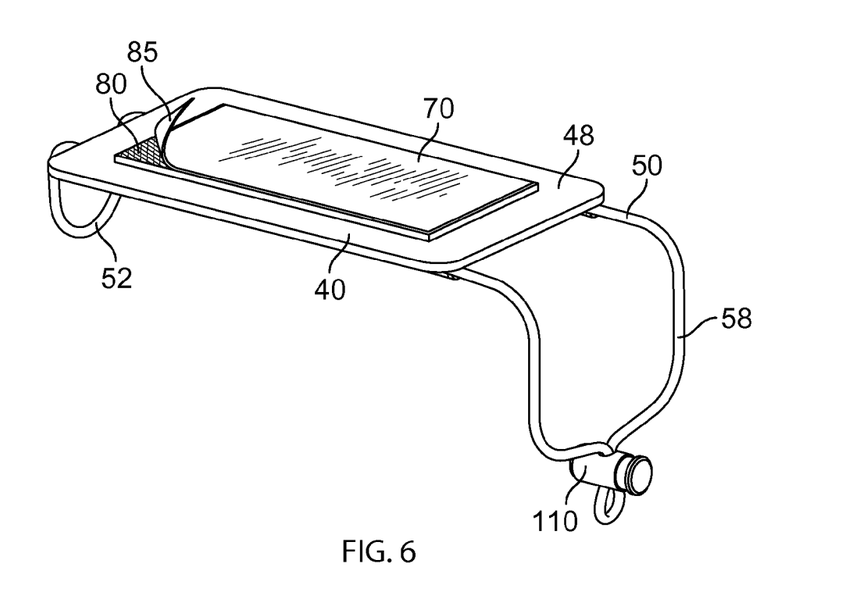
FIG. 6 is a perspective view of yet another embodiment of the invention, illustrating an adhesive attachment member.
Figure 7:
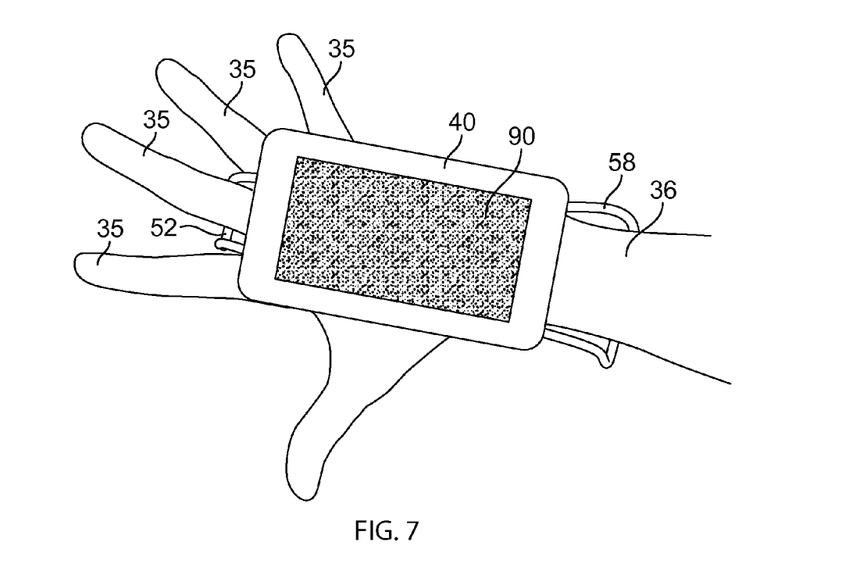
FIG. 7 is a top plan view of FIG. 6, as worn around a finger and wrist of a user.
Figure 8:
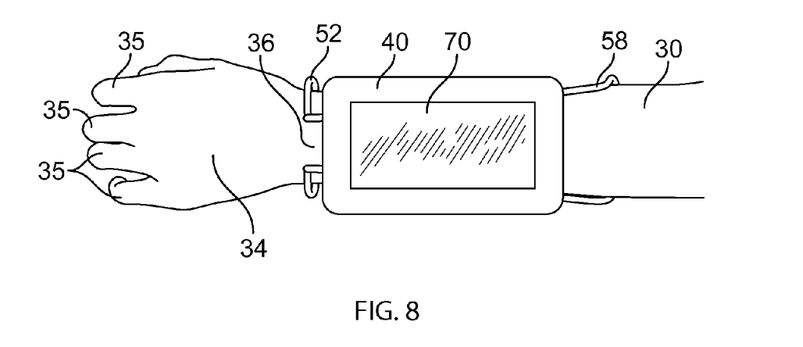
FIG. 8 is a top plan view of FIG. 6, as worn around the just the wrist of the user.
Figure 9:
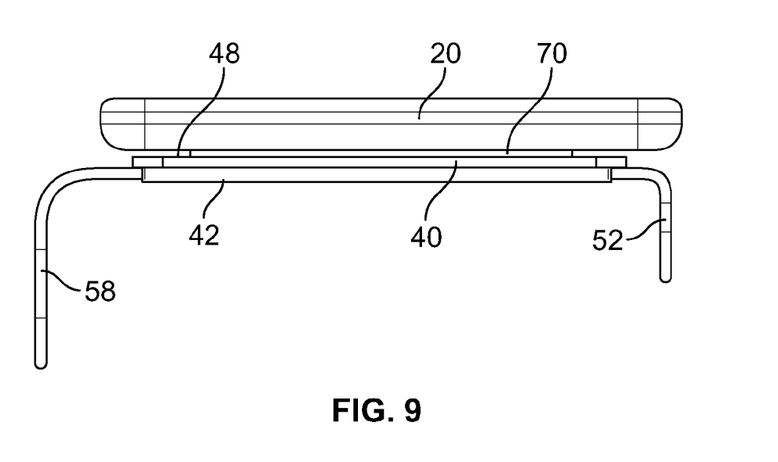
FIG. 9 is a side elevational view of the embodiment of FIG. 7.

In another embodiment, the upper surface 48 includes an attachment member 70 for releasably attaching the base 40 to a lower surface of the portable electronic device 20 (FIGS. 6-9) or, alternately, to a user's case for the portable electronic device 20. The attachment member 70 may include, for example, a sticky adhesive layer 80 beneath a removable liner 85 (FIG. 6). Alternately the attachment member 70 includes a hook-and-loop type fastener 90. In yet another embodiment, the attachment member 70 may include the resilient edge clamps 100 for attaching the base 40 to corner edges 25 of the portable electronic device 20 (FIG. 5), magnets (not shown), or the like.

Figure 1:
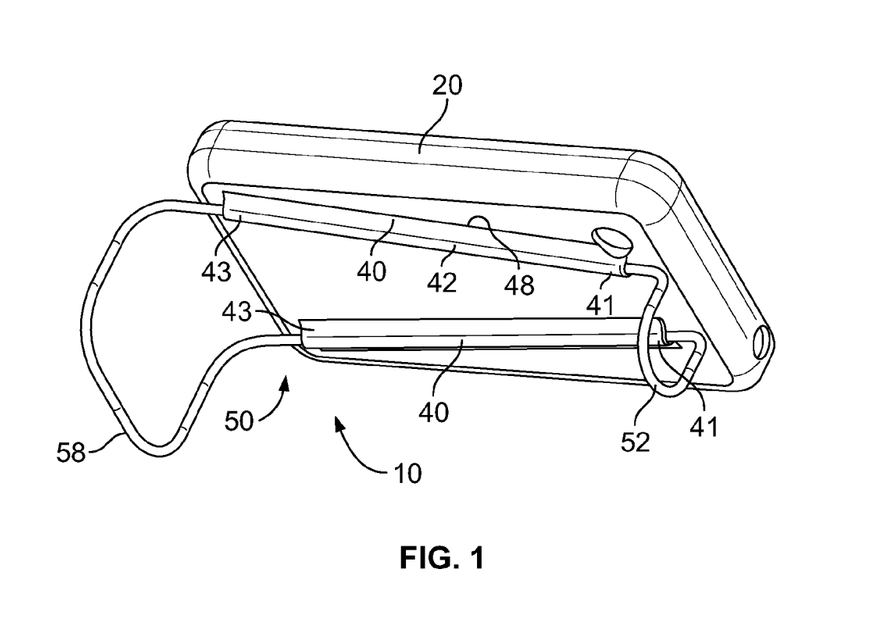
FIG. 1 is a bottom perspective view of one embodiment of the invention.
Figure 2:
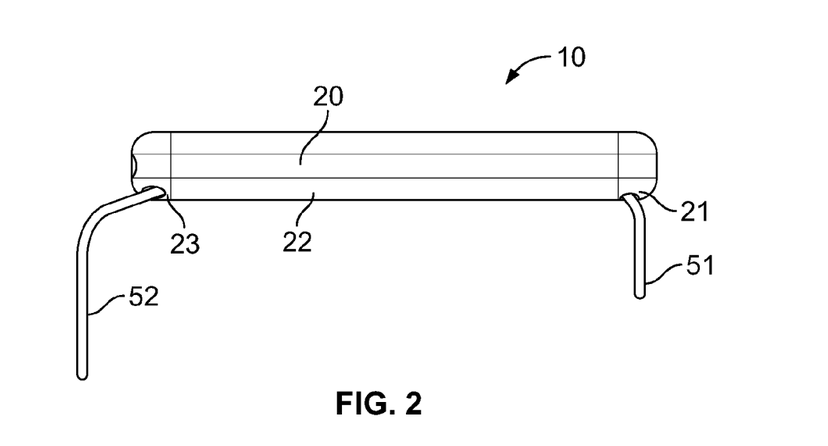
FIG. 2 is a left-side elevational view of an alternate embodiment of the invention.
Figure 3:
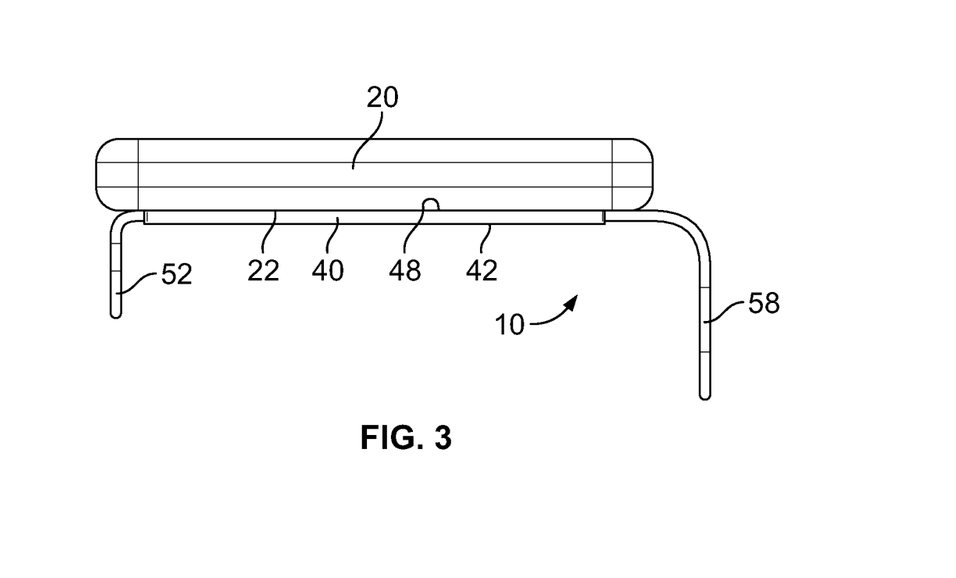
FIG. 3 is a right-side elevational view of FIG. 1.
Figure 4:
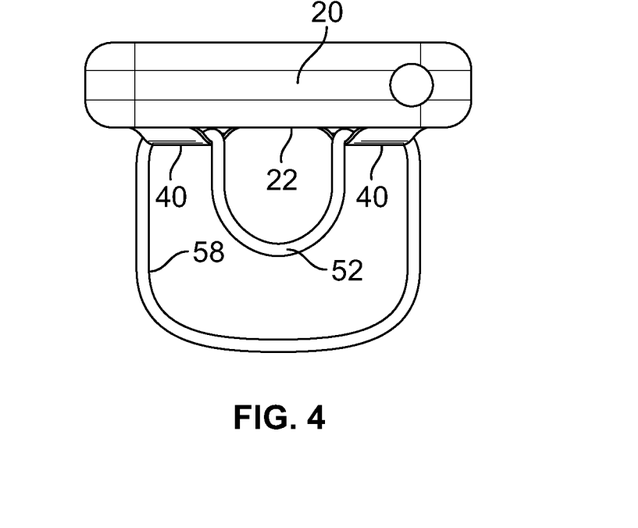
FIG. 4 is a front elevational view of FIG. 1.

In one embodiment, illustrated in FIG. 2, the wearable holder 10 is incorporated into the portable electronic device 20 and constitutes an improvement therein. In such an embodiment, the portable electronic device 20 has a lower surface 22. A front loop 52 is attached with a front portion 21 of the lower surface 22, and a rear loop 58 is attached with a rear portion 23 of the lower surface 22. In such an embodiment the front loop 52 is adapted to wrap about one or more fingers 35 of a user's hand 34, and the rear loop 58 is adapted to wrap about the wrist 36 of the user 30. In such an embodiment the base 40 of the other embodiments is incorporated into the portable electronic device 20 itself, and the loops 52,58 may be part of a single cord material 50 that traverses through the lower surface 22 of the phone through apertures therein.

In use, a method of mounting a portable electronic device 20 to the user's hand 34 comprises the steps of first providing the wearable holder 10 as previously described.

The rear loop 58 is wrapped about the wrist 36 of the user 30, and then the front loop 52 is fixed about one or e more fingers 35 of the user 30. Alternately the front loop 52 may be enlarged by pulling more of the cord material away from the base such that the user's hand 34 may traverse the front loop 52, whereby the portable electronic device 20 may be positioned about the user's wrist 36 with his hand 34 free to move unencumbered by the portable electronic device 20 or the wearable holder 10.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A wearable holder for a portable electronic device, comprising:
    a base having an upper surface for being attached to the portable electronic device, and a lower surface;
    a front loop attached to a front portion of the lower surface of the base; and
    a rear loop attached to a rear portion of the lower surface of the base, wherein the front loop is adapted to wrap about one or more fingers of a user and the rear loop is adapted to wrap about a wrist of the user, the front loop and the rear loop being formed from a single length of cord material.

2. The wearable holder of claim 1 wherein the upper surface of the base is a case for the portable electronic device.

3. The wearable holder of claim 2 wherein the base further includes base apertures through which two side loops project away from the base.

4. The wearable holder of claim 3 wherein the front loop, rear loop and two side loops are all formed from a single length of the cord material.

5. The wearable holder of claim 1 wherein the upper surface includes an attachment member for releasably attaching the base to a lower surface of the portable electronic device.

6. The wearable holder of claim 5 wherein the attachment member includes an adhesive layer protected by a removable liner.

7. The wearable holder of claim 5 wherein the attachment member includes a hook and loop type fastener.

8. The wearable holder of claim 5 wherein the attachment member includes edge clamps for attaching the base to corner edges of the portable electronic device.

9. An improvement for a portable electronic device having a lower surface, wherein a front loop is attached to a front portion of the lower surface of the portable electronic device; and a rear loop is attached to a rear portion of the lower surface of the portable electronic device, the front loop being adapted to wrap about one or more fingers of a user's hand and the rear loop being adapted to wrap about a wrist of the user, the front loop and the rear loop are formed from a single loop of cord material.

10. A method of mounting a portable electronic device to the back of a user's hand, comprising the steps of:
    a) providing a base with an upper surface and a lower surface;
    b) providing a front loop beneath a front portion of the lower surface of the base;
    c) providing a rear loop beneath a rear portion of the lower surface of the base, the front loop and the rear loop formed from a single cord;

d) mounting a portable electronic device to the upper surface of the base; and e) supporting the portable electronic device on the back of the hand of a user.

11. The method of claim 10 further including the step of:

f) wrapping the rear loop around a wrist of the user; and wrapping the front loop about one or more fingers of the user.

12. The method of claim 10 further including the step of:

g) repositioning the portable electronic device from the back of the hand to a side of the hand.

13. The method of claim 10 further including the step of:

h) adjusting the diameter of at least one of the front loop or the rear loop with an adjustable toggle.

* * * * *

UNITED STATES PATENT AND TRADEMARK OFFICE
CERTIFICATE OF CORRECTION

PATENT NO.         : 9,464,755 B1
APPLICATION NO.    : 13/968293
DATED              : October 11, 2016
INVENTOR(S)        : William Inman Page 1 of 1

It is certified that error appears in the above-identified patent and that said Letters Patent is hereby corrected as shown below:

On the Title Page

Item (54) and in the Specification, Column 1, Line 1, in the Title, replace "VIARIABLE" with "VARIABLE"

In the Specification

Column 5, Line 20, replace "about one or e more" with "about one or more"

Signed and Sealed this
Fourteenth Day of March, 2017

Michelle K. Lee
*Director of the United States Patent and Trademark Office*